United States Patent [19]

Weinmann et al.

[11] Patent Number: 5,242,594
[45] Date of Patent: Sep. 7, 1993

[54] PROCESS AND APPARATUS FOR INDUSTRIAL FRACTIONATION OF POLYMERS

[75] Inventors: Klaus Weinmann, Gau Bischofsheim; Lutz Tschersich, Halle; Bernhard A. Wolf, Mainz, all of Fed. Rep. of Germany

[73] Assignee: Pluess-Staufer AG, Oftringen, Switzerland

[21] Appl. No.: 835,900

[22] Filed: Feb. 14, 1992

[30] Foreign Application Priority Data

Feb. 14, 1991 [DE] Fed. Rep. of Germany ....... 4104573

[51] Int. Cl.$^5$ .............................................. B01D 11/04
[52] U.S. Cl. ...................................... 210/634; 210/511
[58] Field of Search ................ 422/131; 528/486, 174; 210/659, 634, 511

[56] References Cited

U.S. PATENT DOCUMENTS 4,031,039 6/1977 Mizumoto et al. ............. 422/131 X

FOREIGN PATENT DOCUMENTS 0127388 12/1984 European Pat. Off. .
0129329 12/1984 European Pat. Off. .
3242130 11/1972 Fed. Rep. of Germany .
3242130A1 8/1984 Fed. Rep. of Germany .

OTHER PUBLICATIONS

Manfred J. R. Cantow, "Polymer Fractionation", Academic Press N.Y. 1967.
Martin Hoffman et al, "Polymer Analysis" Thieme Verlag, Stuttgart, 1977.
Geerissen et al, "Continuous Fractionation and Solution Properties of PVC, 1 Continuous Fractionation, Characterisation", *Makromol. Chem.*, 186 (1985) Apr., No. 4, pp. 735-715.
Geerissen et al, "Continuous Fractionation and Solution Properties of PVC, 4 Pressure Dependence of the Solubility In a Mixed Solvent", *Makromol. Chem.*, 186 (1985) Apr., No. 4, pp. 777-785.
Search Report Dated Dec. 7, 1992.

*Primary Examiner*—Frank Spear
*Attorney, Agent, or Firm*—Lowe, Price, LeBlanc & Becker

[57] ABSTRACT

In a process for industrial fractionation of polymers using an extraction column and a homogeneous extraction agent a homogeneous feed is supplied to a region of the extraction column which is nearer the upper end thereof when the feed has a greater density than the extraction agent and which is nearer the lower end thereof when the feed has a lower density than the extraction agent. An apparatus for carrying out this process consists advantageously, instead of a pulsed sieve plate column as hitherto, of an unpulsed filling body column which leads to a better separation because a back mixing is avoided in favourable manner.

27 Claims, 5 Drawing Sheets

PROCESS AND APPARATUS FOR INDUSTRIAL FRACTIONATION OF POLYMERS

BACKGROUND OF THE INVENTION

1. Field of the Invention

The invention relates to a process for industrial fractionation of polymers using an extraction column and an extraction agent as well as an apparatus for carrying out said process.

2. Description of the Prior Art

The fractionation of polymers from a solution is already known from M. J. R. Cantow: Polymer Fractionation; Academic Press N.Y. 1967, and from M. Hoffmann, H. Krömer, R. Kuhn: Polymer analysis, Thieme Verlag, Stuttgart, 1977. The polymer present in diluted solution is separated according to the molecular weight and/or according to the chemical composition with the aid of phase equilibria, and by frequent repetition of discontinuous basic steps and appropriate recombination of intermediate fractions good separating results can be achieved. However, an economic exploitation of the process is prevented by a high expenditure of working time and solvent required in a fractionation exceeding the gram scale.

A process of the type mentioned at the beginning is already disclosed in DE-OS 3,242,130. In this known process advantageous use is made of the effect that from polymer samples of high molecular and/or chemical irregularity products which are more uniform can be prepared if the polymers to be fractionated are dissolved in a suitable one or multi-component solvent and said solution or said feed extracted continuously in counter flow with the aid of a second solution or extraction agent containing the same solvent components as the feed. The solution component(s) in the feed and in the extraction agent is/are so chosen that firstly the entire system of starting polymers and solvent component(s) at the operating temperature has a miscibility gap, that secondly the composition of the phase in the phase diagram corresponds to a point outside the miscibility gap and that thirdly the extraction agent is made up so that the connecting line between the feed and extraction agent (operating line) intersects the miscibility gap.

To optimize the separation the ratio of the flows of feed and extraction agent was so chosen that the operating point, i.e. the mean composition of the total content of the fractionating apparatus in stationary operation, lies at higher polymer concentrations than the intersection point of the operating line with the respective portion of the separation curve belonging to the lower polymer concentration. In all cases the operating point is selected in the interior of the miscibility gap. The fractionation is achieved in that the polymer molecules introduced into the extraction column divide themselves up to a different extent amongst oppositely flowing phases in accordance with their molecular weight, their chemical composition or their geometric structure, the separation being facilitated by additional steps, for example a high dispersion of the phases. Thus, the operation is carried out with a particular form of a continuous counter-flow extraction in which preferably an "inner miscibility gap" is used in which a separation takes place only in the presence of the polymer. Put simply, for example the polymer molecules of different length must not decide whether they prefer a certain solvent, which is only limitedly miscible with another, to another solvent but merely whether they wish to be present in the more diluted or in the more concentrated phases flowing past each other.

A disadvantage in this known process is that for thermodynamic reasons it cannot be avoided that the sol removed still contains considerable proportions of long chains, i.e. that a satisfactory fractionation can only be achieved by several different experiments. The known fractionating process is therefore to be considered as technically impracticable.

SUMMARY OF THE INVENTION

The problem underlying the invention is to make available a process and an apparatus for industrial fractionation of polymers in which and with which high-molecular substances can be separated with a distinctness comparable to low-molecular substances, in accordance with different criteria (in particular molecular weight, chemical structure, geometrical structure). The process is also to be suitable for the processing/recycling and reuse of plastics and the polymer fractionated by the process and with the apparatus is to be usable as dispersing agent and/or as grinding aid for fillers and/or minerals and/or pigments.

The process according to the invention for industrial fractionation of polymers using an extraction column and a homogeneous extraction agent advantageously includes the following process steps (a) a homogeneous feed is supplied to a region of the extraction column which is nearer to the upper end thereof when the feed has a greater density than the extraction agent and which is nearer to the lower end thereof when the feed has a lower density than the extraction agent;

(b) the homogeneous extraction agent is supplied to a region of the extraction column nearer to the lower end when the feed has a greater density than the extraction agent and is supplied to a region nearer to the upper end when the feed has a lower density than the extraction agent, the column section lying below the upper supply point being held at a first temperature $T_1$;

(c) the flows of the feed and extraction agent are selected in such a manner that at the temperature $T_1$ two phases coexist and the desired distribution of the starting polymer amongst the two fractions obtained is ensured, a further transport of the polymer-poorer phase originating from the extraction agent being effected to an adjoining column region in which a temperature $T_2$ obtains which is lower than the temperature $T_1$ when the polymer solubility decreases with decreasing temperature and which is higher than the temperature $T_1$ when the polymer solubility decreases with increasing temperature;

(d) at the temperature $T_2$ a polymer-richer phase is separated which moves into the adjoining column region with the temperature $T_1$, is no longer completely dissolved there and is incorporated into the extraction process in such a manner that in the stationary state at the column end at which this phase emerges a gel phase is removed which contains the molecular constituents desired in the one fraction;

(e) at the other column end the sol phase is discharged which contains the molecular constituents desired in the other fraction; and (f) the steps (a) to (e) are repeated with direct use of the gel fraction obtained as feed until the starting sample has been broken down into the desired number of fractions.

The apparatus according to the invention for carrying out the process advantageously consists of an extraction column having an elongated housing which comprises a lower section having a first temperature control means and an adjoining upper second section having a second temperature control means and a first inlet for feed-extraction agent nearer to the upper end of the extraction column, a second inlet for extraction agent-feed nearer to the lower end of the extraction column, a fraction discharge at the upper end of the extraction column and a fraction discharge at the lower end of the extraction column. In accordance with the invention it is advantageously possible for the first time to break the starting polymers down in a process step in such a manner that the separated sol fraction is immediately available with the desired uniformity and the gel fraction formed can immediately be used again for the separation of the next fraction by repeated extraction under changed conditions with regard to the composition of the extraction agent, the dimensioning of the feed flows and the setting of the temperatures.

In advantageous manner, above and below the feed and extraction agent inlet respectively from the sol phase transported further upwardly or downwardly a new polymerrich phase is separated, the latter again sedimenting or rising phase preferably containing the more sparingly soluble molecules.

According to a preferred further development of the invention, advantageously the temperature $T_1$ in the case of binary systems is selected up to 30° C. remote from the extreme of the turbidity curve in the interior of the miscibility gap and in the case of ternary systems in the temperature range of the liquid/liquid separation, $T_2$ being fixed up to 40° C. from $T_1$, according to the temperature influences on the solubility of the polymers, both for the binary and for the ternary systems.

Preferably, it is further provided that in the process step (f) when using mixed solvents their content of the thermodynamically better component is increased to such an extent that whilst retaining the temperature $T_1$ the more readily soluble constituents of the gel fraction of the previous process step used as feed become soluble, the temperature $T_2$ being closer to the temperature $T_1$ than in the preceding step due to the increased uniformity of the feed. When using a single-component solvent in the process step (f) in the case of decreasing polymer solubility with decreasing temperature the temperature $T_1$ is raised and the temperature $T_2$ is set at a distance beneath the temperature $T_1$ which increases with decreasing amount of the mixing heat of the system, whilst preferably when using a single-component solvent in the case of decreasing of the polymer solubility with increasing temperature the temperature $T_1$ is lowered and the temperature $T_2$ is selected correspondingly above said value.

The process according to the invention and the apparatus according to the invention are for example suitable for the following four fractionation tasks:

1) Industrial fractionation of polymer samples which contain only linearly structured molecules of different molecular weight of chemically identical structural elements (linear homopolymers), the polymer solubility decreasing with increasing molecular weight and decreasing temperature, the feed having a greater density than the extraction agent.

2) Industrial fractionation of polymer samples which contain only linearly structured molecules of different molecular weight of chemically identical structural elements (linear homopolymers), the polymer solubility decreasing with increasing temperature and the density of the feed being greater than that of the extraction agent.

3) Industrial fractionation of polymer samples which contain only linearly structured molecules of different molecular weight of chemically identical structural elements (linear homopolymers), the polymer solubility decreasing with increasing molecular weight and decreasing temperature, the density of the feed being less than that of the extraction agent.

4) Industrial fractionation of polymer samples which contain only linearly structured molecules of different molecular weight of chemically identical structural elements (linear homopolymers), the polymer solubility decreasing with increasing molecular weight and with increasing temperature, the density of the feed being less than that of the extraction agent.

In the first case mentioned the homogeneous feed is introduced in a region of the extraction column which is nearer to the upper end thereof and the homogeneous extraction agent is supplied in the region of the lower end of the extraction column, the temperature $T_1$ being greater than the temperature $T_2$.

In the second case the supply of the feed and the extraction agent is as in case 1 but the temperature $T_2$ is greater than the temperature $T_1$.

In the third case the homogeneous feed is supplied in a region nearer the lower end of the extraction column and the extraction agent in the region of the upper end of the column, the temperature $T_1$ being greater than the temperature $T_2$.

In the fourth case the feed and the extraction agent are supplied as in case 3 but the temperature $T_2$ is greater than the temperature $T_1$.

The composition of the feed is defined in favourable manner by a point in the Gibbs phase triangle which lies outside the miscibility gap of the respective system for a given operating temperature. This starting solution should have the highest possible concentration of polymer, and in the case where a mixed solvent is used, already contain an adequate amount of thermodynamically poor solvent.

The choice of the solvents results from the necessity of a stable liquid/liquid separation for the operation of a continuous fractionation. Preferably, when using a single-component solvent the temperature $T_1$ is selected so that for the case of solubility decrease of the polymer with decreasing temperature it lies beneath the maximum turbidity temperature and for the case of solubility decrease with increasing temperature it lies above the minimum turbidity temperature. Preferably, when using a mixed solvent the temperature $T_1$ is selected so that a stable liquid/liquid separation takes place (prevention of crystallization), a chain breakdown of the polymer does not occur and the macroscopic phase separation takes place within the residence time of the phases in the apparatus. During the entire fractionation duration the feed is kept stable as regards the separation of a liquid or solid phase and the polymer must not exhibit chain disintegration under these conditions. Depending on the fractionation, the composition of the mixed solvent is preferably chosen in such a manner that the connection line between the points in the Gibbs phase triangle representing the composition of the feed and the extraction agent intersect the associated miscibility gap. Examples of the feed composition are contained in the table in the following description section.

Preferably, the starting polymers are separated according to their chain length or substantially independently thereof according to their linear branched or cyclic structure or according to their different content of chemically different structural elements. If the polymer molecules of a starting sample differ not only in their molecular weight but also in their geometrical structure, for example in their linearity or a different degree of branching, and/or in their chemical structure, for example copolymers of the monomers A and B, the solvents must be selected in accordance with the specific objective. The same applies to the fractionation of cyclic compounds. This means for example in the case of a desired separation of copolymers in accordance with their chemical composition (substantially independently of their molecular weight) that the solubility in the selected extraction agents must depend more on the chemical nature of the polymers than on their molecular mass. If the A-rich polymer molecules are more sparingly soluble than the B-rich molecules, the former will be contained in the gel fraction and the latter in the sol fraction.

The solubility of the copolymers depends firstly on their molar mass and secondly on their chemical composition. In numerous cases, solvents/precipitation agent combinations have been found which separate mainly according to the first or according to the second aspect. In addition to other methods with which the expert is familiar, pairs suitable for this purpose can be determined by turbidity titration.

The homogeneous extraction agent may be a single-component or multi-component solvent. In the repetition of the process steps according to feature (f) of claim 1 when using mixed solvents preferably their content of the thermodynamically better component is increased to such an extent that whilst retaining the temperature $T_1$ the shortchain constituents of the gel fraction of the previous process step used as feed become soluble. Due to the increased uniformity of the feed the temperature $T_2$ is then to be chosen closer to $T_1$ than in step (d).

According to a preferred further development of the process, when using single-component solvents the temperature $T_1$ is comparatively increased and a temperature $T_2$ far enough therebelow for the separation of a second phase chosen (for the above case conditions 1).

For the ratio $T_1:T_2$ no general criteria can be specified. In the course of a complete fractionation, i.e. breaking down a widely dispersed starting product into several fractions of high uniformity, $T_2$ and $T_1$ must be brought closer together with progressive fractionating stages, the irregularity of the feed becoming smaller. The distance of the operating temperature $T_1$ chosen from the separating temperature $T_2$ for a given composition of the solution is governed by the objectives of the fractionation.

For the execution of the process, knowledge of the initial distribution and a decision on the desired uniformity of the fractions is important. The less uniform the product to be separated is, the smaller the sol proportion removed in an extraction step must be kept in order to achieve the desired fractionation. The extraction of small amounts is promoted by reducing the flow of the extraction feed for the same feed flow or using extraction agents of lower solubility power and keeping the two flows constant.

Preferably, in separation of polyacrylic acid in a concentrated aqueous solution the solution thereof in a mixture of water and an Mg salt or another analogously acting salt is used as feed and a concentrated aqueous solution of the Mg salt or of the analogous salt is used as extraction agent. Preferably, in separation of polyvinyl chloride (PVC) molecules as feed composition a 100% mixture of THF/water/PVC of 75-85%/7.5-12.5%/7.5-12.5% is selected, as extraction agent a 100% mixture of THF/water in the ratio 80-90%/10-20%, a temperature of $T_1$ of 22°-26° and an operating concentration of 4-6% PVC.

Preferably, in separation of polyisobutylene (PIB) molecules as feed composition a 100% mixture of toluene/methylethyl ketone/PIB of 68-76%/13-17%/11-15% is selected, as extraction agent a 100% mixture of toluene/methylethyl ketone of 75-85%/15-25%, a temperature $T_1$ of 20°-24° C. and an operating concentration of 3-5% PIB.

For the fractionation obtainable under otherwise the same conditions, an optimized polymer charging of the extraction column is also favourable and lies for example in the range of mean values in particular between 3 and 5% by weight of the polymer with respect to the total liquid content.

The polymer charging for the column must be individually determined for the particular system. However, it is generally true that in the case of fractionation in the subcritical range a polymer concentration of ⅓ of the critical concentration is selected and in the case of the supercritical fractionation a concentration of 4/3 to 7/3 of the critical concentration.

With regard to the temperature ranges possible for the fractionation, usually operating at room temperature is to be assumed but chemical necessities may make deviations necessary, as for example in the case of polyethylene for which no solvent at temperatures below about 100° C. exists.

The process according to the invention is suitable in favourable manner for the processing and recycling and reuse of plastics. A preferred use of the polymer to be fractionated according to the process is in the form of a dispersing agent and/or as grinding agent for filler and/or as minerals and/or pigments, in particular for the paper industry.

The apparatus according to the invention for carrying out the process consists advantageously, instead of a pulsed sieve-plate column as hitherto, of an unpulsed filling body or packing body column which due to its configuration requires a comparatively reduced technical expenditure and leads to better separation because in favourable manner a back mixing is avoided.

Preferably, the filling bodies are free from flushable or liquid-filled cavities and have a surface to which neither of the two phases adheres. The extraction column according to a preferred further development of the invention is a continuously or periodically agitated column, and in the case of the agitated column a Scheibel column is preferably provided.

The extraction column further expediently contains one or more mixer-separator stages and according to a preferred further development instead of the two temperature control means has one temperature control means which generates a temperature gradient along the fractionating column.

In the apparatus housing of the extraction column provided for densities of the gel phases which are greater than those of the sol phases, above the region with the temperature $T_1$ or in the converse case beneath the region with the temperature $T_1$ an additional region is provided above or below the supply of the homogeneous feed in which in favourable manner conditions are created under which from the sol phase transported further upwardly or downwardly a new phase is separated, this again sedimenting or rising phase preferably containing the more sparingly soluble components.

In the aforementioned first case this separation is preferably achieved in that the temperature $T_2$ is lowered with respect to the temperature $T_1$ with the result that the separated phase for thermodynamic reasons does not dissolve again even on reaching the zone in which the temperature $T_1$ obtains. The necessary cooling depends in the first case (normal case) referred to on the system used. Thus, in favourable manner a treatment of the absorbing phase from which the sol results is carried out and can be compared with a socalled "refluxing". The separating force achieved is as good as the range obtained in related methods (rectification and extraction) with low-molecular mixtures.

Due to the particular extraction provided of the polymerrich phase newly formed in the upper part it is possible in a technically and economically acceptable manner to break the starting polymer down in one process step so that the separated sol fraction is immediately available with the desired uniformity and the gel fraction formed is immediately available again for the separation of the next fraction by repeated extraction under changed conditions.

As a further advantage of the invention it is to be pointed out that for industrial fractionation of polymers the use of gels as new feed suffices and thus the sols need not be processed for reuse as feed, this making it possible to greatly reduce the expenditure of time and solvents and thus also the operating costs. This is particularly significant against the background that in the processes hitherto known sol fractions had to be used again as feed in order to obtain narrow fractions. Preferably, the procedure is conducted in such a manner that in the individual process passes small amounts of more readily soluble material are extracted because this leads not only to a higher fractionation effectiveness because the operating point is shifted deeper into the miscibility gap but also has practical advantages because the gel phases can be immediately used as feed for subsequent process passes and fluctuations in the operating conditions have considerably reduced consequences. In addition, there is a substantial practical significance in that considerable amounts of solvents can be saved because in each process pass step a final fraction can be extracted.

BRIEF DESCRIPTION OF THE DRAWINGS

Hereinafter the invention will be explained in detail with reference to the attached drawings, wherein.

DESCRIPTION OF THE PREFERRED EMBODIMENTS

Figure 1:
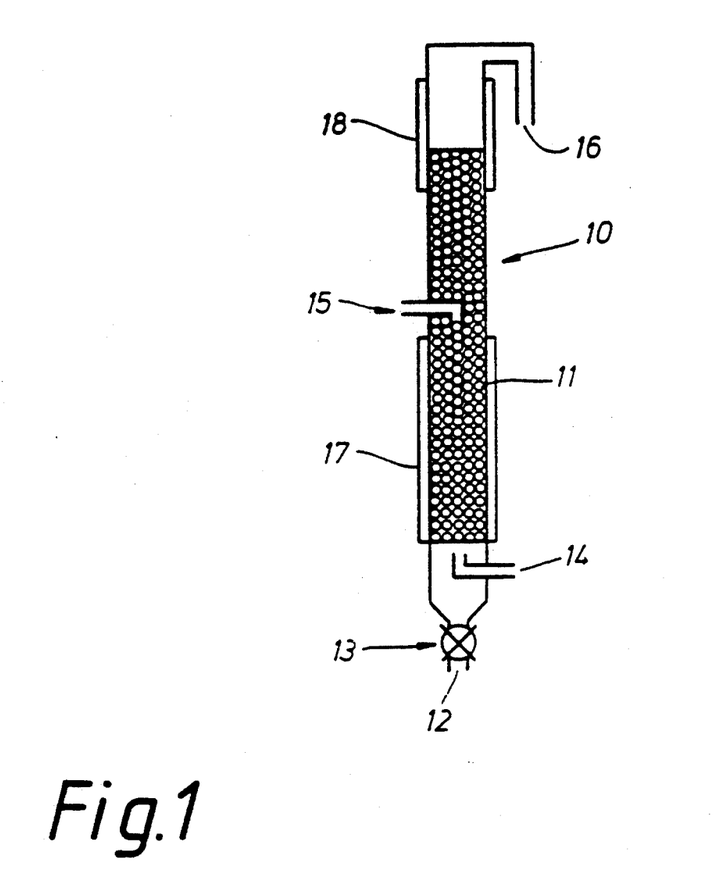
FIG. 1 shows a schematic illustration of an apparatus for carrying out the process according to the invention.
Figure 2:
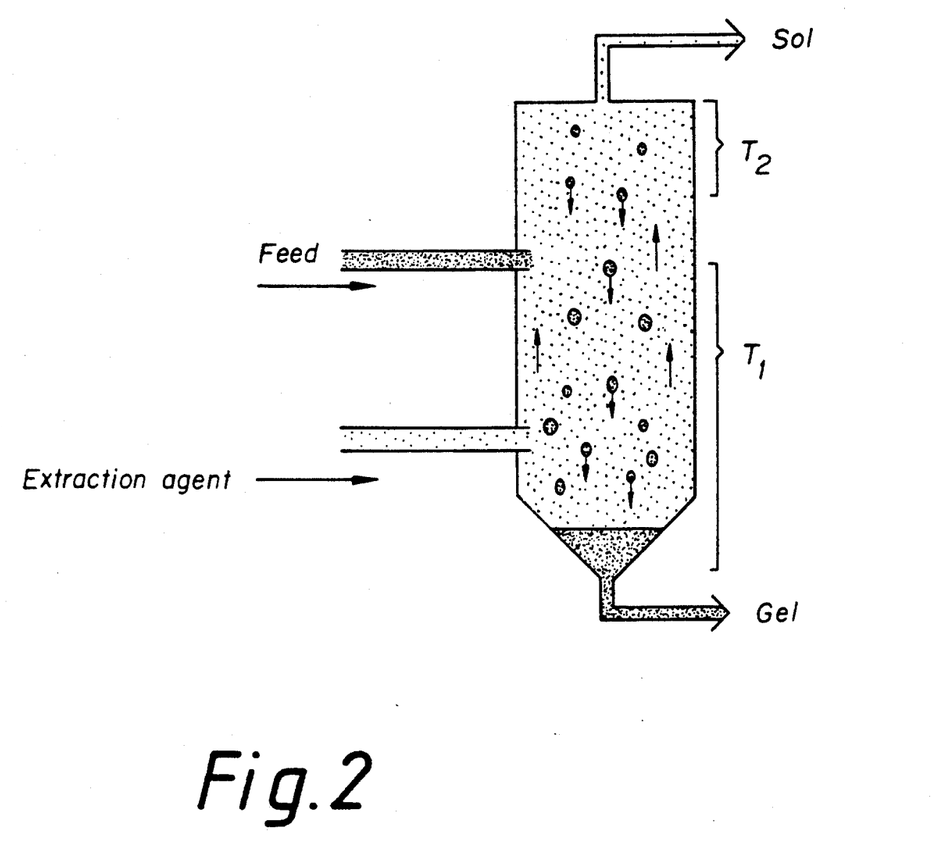
FIG. 2 is a process scheme for describing the process for industrial fractionation of polymers according to the invention.

FIGS. 1 and 2 illustrate schematically the fundamental process sequence using an extraction column 10 which is filled with filling or packing bodies. Illustrated is the upper first case of a continuous industrial fractionation of polymers which contain only linearly structured molecules of different molecular weight comprising chemically identical structural elements (linear homopolymers), the polymer solubility decreasing with increasing molecular weight and with decreasing temperature and the density of the feed being greater than that of the extraction agent. Illustrated schematically is an extraction column 10 which consists of an elongated preferably cylindrical housing which is provided with filling bodies 11. The filling bodies 11 consist of an inert material. They are free from flushable and liquid-filled cavities and have a surface to which no phases containing polymers adhere. The extraction column 10 comprises at its lower end a gel outlet 12 which can be sealed by a closure means 13 such as a cock or a valve. In the lower region of the extraction column there is an inlet 14 for supplying an extraction agent and substantially in the region of the centre of the extraction column 10 an inlet 15 for supplying a feed is formed, whilst the upper end of the extraction column 10 has an outlet 16 for withdrawing sol. The column section lying beneath the upper supply point is kept at an adjustable temperature $T_1$ by means of a schematically indicated temperature control means 17 which in FIG. 1 is shown only schematically as heating or cooling sleeve. The filling of the extraction column 10 with filling bodies 11 continues over the region of the inlet 15 upwardly over a temperature transition region into a section which is held by a second temperature control means, designated schematically by 18, at a temperature $T_2$. The temperature control $T_2$ must be suitably spaced from the feed supply. In the limit case $T_1$ and $T_2$ may directly adjoin each other. The supply of the feed to the inlet 15 and the extraction agent to the inlet 14 takes place in a manner not illustrated by means of a pump.

In a particular embodiment the extraction column is configured as agitated column. The agitated column may for example be a Scheibel column. In a further particular embodiment an extraction column is used which contains one or more mixer-separator stages.

For further refinement of the process for industrial fractionation of polymers a temperature control means generating a temperature gradient along the fractionating column is also suitable. For industrial uses the height of the extraction column 10 is preferably about 3 to 6 m and depends on the particular feed and extraction agent charges, in particular the sedimentation rates and the molecular weights of the downwardly sinking fractionating constituents. The diameter is preferably of the order of magnitude between 10 and 30 cm.

A schematic illustration of the process is given in FIG. 2.

Figure 3:
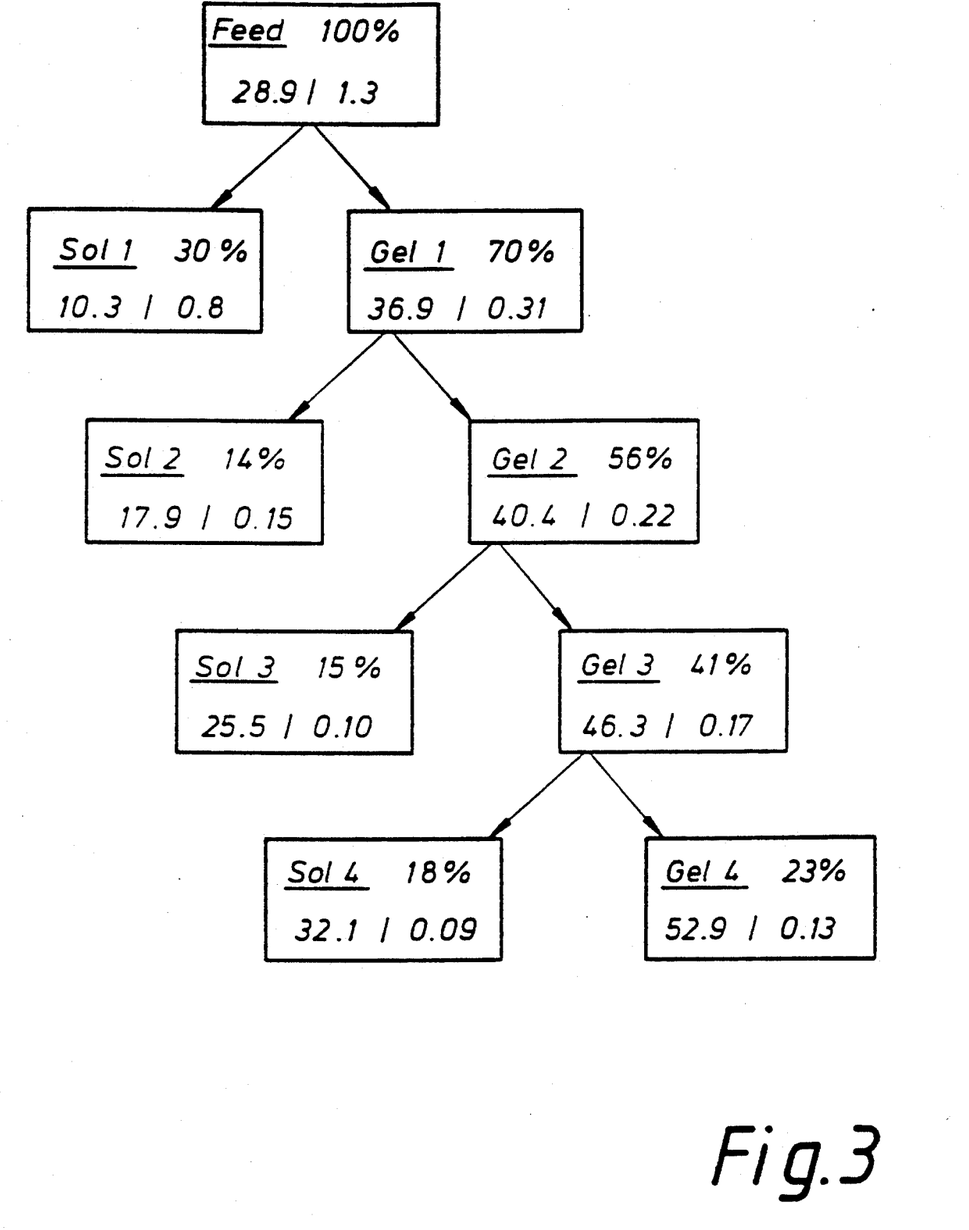
FIG. 3 shows an example of a fractionating scheme which represents the results of a fractionation according to the process of the invention carried out in four steps.
Figure 4:
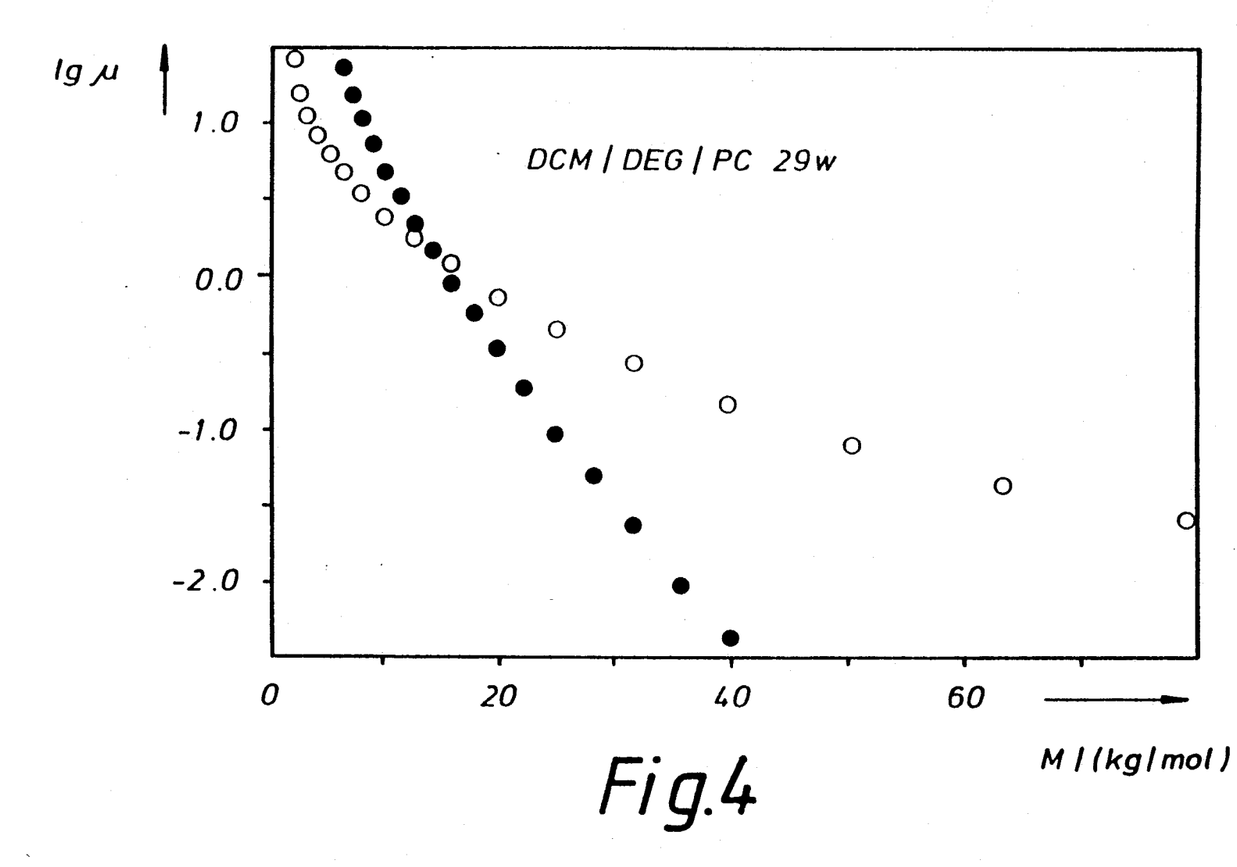
FIG. 4 shows a graphical illustration wherein $\mu$, the logarithmated ratio of the proportions of a polymer with the polymerization degree i in the sol to those of the gel is plotted against the molar mass (M). This makes a quantitative assessment of the fractionating efficiency possible. The greater slope of the linear portion as results in the case of the continuous polymer fractionation (o) according to the invention shows when compared with the smaller slope of the curve for the case of the continuous polymer fractionation according to the prior art (o) the increased fractionating efficiency of the apparatus according to the invention.
Figure 5:
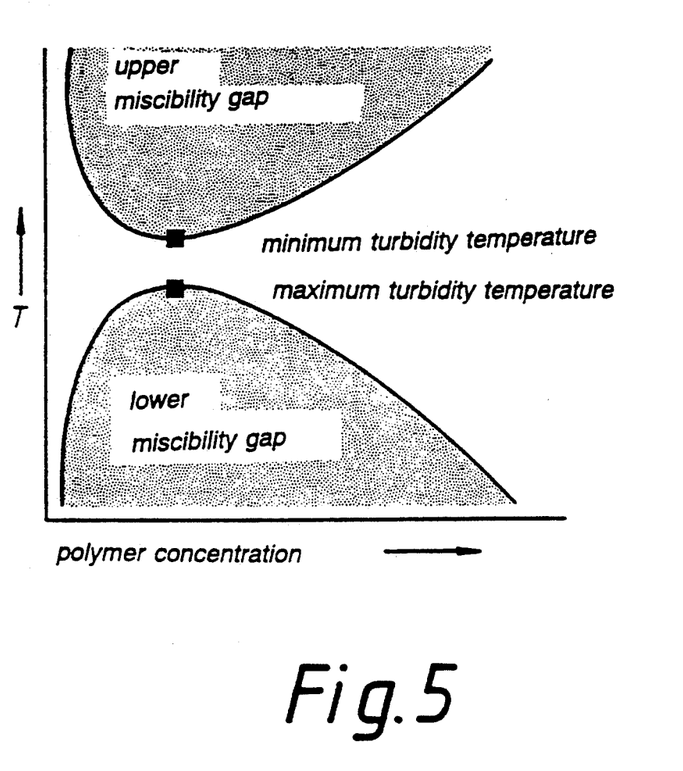
FIG. 5 shows a schematic illustration of turbidity curves for systems in which the solubility of the polymer decreases with increasing temperature (upper miscibility gap) or increases (lower miscibility gap).

FIG. 3 represents a complete fractionating scheme of bisphenol-A-polycarbonate ($M_W$=28.9 kg/mol; U=1.3). The objective of the fractionation was the division of the starting product into five substantially equisize fractions of high uniformity. The arrow pairs each denote a fractionating step, the product to be fractionated forming the starting point of the arrows and the tips being directed towards the resulting sol or gel.

The run C1 (see Table) thus represents the fractionation of the raw product. In this first step 30% by weight of the polymer were able to reach the diluted phase. The relative low uniformity of the first sol results from the molecular weight distribution of the starting product in which a large number of different length low-molecular polymer chains are still present.

In the further fractionating steps in each case the gel was used as new feed without further processing. By varying the EA composition (extraction agent composition) it was possible to separate in each case about 20% polymer as sol. The irregularities of the end products $$U = \frac{M_W}{M_n} - 1$$

($M_w$=weight mean of the molecular weight; $M_n$=numerical mean of the molecular weight) were in the range of U=0.1.

The thickly bordered fields of FIG. 3 represent the final products of the fractionation.

Proceeding from the first case referred to above, a homogeneous feed is supplied by a means not illustrated to the extraction column in the centre region. The homogeneous feed is one containing the polymer to be fractionated in at least one solvent.

EXAMPLES

The process according to the invention was applied to the fractionation of the following substances:
Polyvinyl chloride (PVC),
Polystyrene (PS),
Polyisobutylene (PIB),
Polyethylene (PE) and
Bisphenol-A-polycarbonate (PC).

For PVC the following operating parameters were chosen:

| PVC: | Feed composition: | THF/water/PVC = 80/10/10 |
|---|---|---|
| | Extraction agent: | THF/water = 85/15 |
| | Operating conc.: | about 5% PVC |
| | Temperature $T_1$: | 24° C. |

For PIB the following operating parameters were chosen:

| PIB: | Feed composition: | Toluene/methylethyl ketone/PIB = 72/15/13 |
|---|---|---|
| | Extraction agent: | Toluene/methylethyl ketone/ = 80/20 |
| | Operating conc.: | about 4% PIB |
| | Temperature $T_1$: | 22° C. |

Example for case 2 (homopolymers of which the solubility decreases with increasing temperature and for which the density of the feed is greater than the density of the extraction agent). For a fractionation with the aid of a mixed solvent the ternary system acetone/butanone/polystyrene with a molecular-weight-dependent minimum separation temperature in the region of 95° C. is suitable. The operating conditions were so chosen that $T_1$ lies above 95° C. and $T_2$ is a few degrees higher than $T_1$.

Example for case 3 (homopolymers of which the solubility decreases with decreasing temperature and the density of the feed is less than the density of the extraction agent). A fractionation of linear polyethylene was carried out at temperatures of $T_1$=130°-140° C. At these temperatures crystallization of the polymer could be prevented. As solvent, diphenyl ether was used having a density adequately different, i.e. at least 0.03 g cm$^{-3}$, from that of the polymer.

In the following Table further examples of embodiment of the invention are given together with comparative examples.

TABLE

Tests with continuous polymer fractionation (CPF tests) with the system dichloromethane/diethylene glycol/bisphenol A-polycarbonate

| | | | Column | | |
|---|---|---|---|---|---|
| | 1 | 2 EA | 3 T/°C. | 4 | 5 |
| CPF run feed | $w_1/w_2/w_3$ | $w_2$ | $T_1$ | $T_2$ | $W_{wp}$ |
| A | 0.82/0.13/0.05 | 0.22 | 23 | / | 0.025 |
| B | 0.81/0.11/0.08 | 0.20 | 23 | / | 0.018 |
| C1 | 0.77/0.08/0.15 | 0.22 | 21 | −3 | 0.013 |
| C2 | Gel of C1 | 0.21 | 23 | +1 | 0.015 |
| C3 | Gel of C2 | 0.20 | 25 | +5 | 0.012 |
| C4 | Gel of C3 | 0.19 | 25 | +12 | 0.017 |
| D | 0.77/0.08/0.15 | 0.19 | 21 | +11 | 0.032 |

A: Conventional CPF pulsed sieve plate column with sol outlet at the feed inlet.
B: As A but with filling bodies (glass beads, d = 4-7 mm) without pulsation.
C1-C4: Tests according to the process of the invention with filling bodies (glass beads, d = 4 mm)
D: As C1-C4 but with d = 8 mm glass beads
CPF: Continuous polymer fractionation
EA: Extraction agent
The composition of feed and extraction agent is given in weight fractions (w), the index 1 denoting dichloromethane, 2 diethylene glycol and 3 bisphenol A-polycarbonate.
$W_{wp}$ denotes the mean polymer concentration in the column.

We claim:
1. Process for industrial fractionation of polymers using an extraction column and a homogeneous extraction agent, characterized by the following process steps:
 (a) a homogeneous feed is supplied to a region of the extraction column which is nearer to the upper end thereof when the feed has a greater density than the extraction agent and which is nearer to the lower end thereof when the feed has a lower density than the extraction agent;
 (b) the homogenous extraction agent is supplied to a region of the extraction column nearer to the lower end when the feed has a greater density than the extraction agent and is supplied to a region nearer to the upper end when the feed has a lower density than the extraction agent, the column section lying below the upper supply point being held at a first temperature $T_1$;

(c) the flows of the feed and extraction agent are selected in such a manner that at the temperature $T_1$ two phases coexist and the desired distribution of the starting polymer amongst the two fractions obtained is ensured, a further transport of the polymer-poorer phase originating from the extraction agent being effected to an adjoining column region maintained at a temperature $T_2$ which is lower than the temperature $T_1$ when the polymer solubility decreases with the decreasing temperature and which is higher than the temperature $T_1$ when the polymer solubility decreases with increasing temperature;

(d) at the temperature $T_2$ a polymer-richer phase is separated which moves into the adjoining column region maintained at the temperature $T_1$, is no longer completely dissolved there and is incorporated into the extraction process in such a manner that in the stationary state at the column end at which this phase emerges a gel phase is removed, which gel phase contains the molecular constituents desired in the one fraction;

(e) at the other column end the sol phase is discharged, which sol phase contains the molecular constituents desired in the other fraction; and (f) the steps (a) to (e) are repeated with direct use of the gel fraction obtained as feed until the starting sample has been broken down into the desired number of fractions.

2. Process according to claim 1, characterized in that the temperature $T_1$ in the case of binary systems is selected up to 30° C. remote from the extreme of the turbidity curve in the interior of the miscibility gap and in the case of ternary systems in the temperature range of the liquid/liquid separation, $T_2$ being fixed up to 40° C. from $T_1$, according to the temperature influences on the solubility of the polymers, both for the binary and for the ternary systems.

3. Process according to claim 1 characterized in that in the process step (f) when using mixed solvents their content of the thermodynamically better component is increased to such an extent that whilst retaining the temperature $T_1$ the more readily soluble constituents of the gel fraction of the previous process step used as feed become soluble, the temperature $T_2$ being closer to the temperature $T_1$ than in the preceding step due to the increased uniformity of the feed.

4. Process according to claim 1 characterized in that when using a single-component solvent in the process step (f) in the case of decreasing polymer solubility with decreasing temperature the temperature $T_1$ is raised and the temperature $T_2$ is set at a distance beneath the temperature $T_1$ which increases with decreasing amount of the mixing heat of the system.

5. Process according to claim 1 characterized in that when using a single-component solvent in the case of decreasing of the polymer solubility with increasing temperature the temperature $T_1$ is lowered and the temperature $T_2$ is selected correspondingly above said value.

6. Process according to claim 1 characterized in that the composition of the feed is defined by a point in the Gibbs phase triangle which lies outside the miscibility gap of the respective system for a given operating temperature.

7. Process according to claim 1 characterized in that when using a single-component solvent the temperature $T_1$ is selected so that for the case of solubility decrease of the polymer with decreasing temperature it lies beneath the maximum turbidity temperature and for the case of solubility decrease with increasing temperature it lies above the minimum turbidity temperature.

8. Process according to claim 1 characterized in that when using a mixed solvent the temperature $T_1$ is selected so that a stable liquid/liquid separation takes place to prevent crystallization, a chain breakdown of the polymer does not occur and the macroscopic phase separation takes place within the residence time of the phases in the apparatus.

9. Process according to claim 1 characterized in that the composition of the mixed solvent, depending on the fractionation, is selected so that the connecting line between the points in the Gibbs phase triangle which represent the composition of the feed and of the extraction agent intersects the associated miscibility gap.

10. Process according to claim 1 characterized in that the starting polymers are separated according to their chain length or substantially independently thereof according to their linear, branched or cyclic structure or according to their different content of chemically different structural elements.

11. Process according to claim 1 characterized in that in separation of polyacrylic acid in a concentrated aqueous solution the solution thereof in a mixture of water and an Mg salt or another analogously acting salt is used as feed and a concentrated aqueous solution of the Mg salt or of the analogous salt is used as extraction agent.

12. Process according to claim 1, characterized in that in separation of polyvinyl chloride (PVC) molecules, as feed composition a 100% mixture of THF/water/PVC of 75–85%/7.5–12.5%/7.5–12.% is selected, as extraction agent a 100% mixture of THF/water in the ratio 80–90%/10–20% is selected, a temperature of $T_1$ of 22°–26° C. is selected and an operating concentration of 4–6% PVC is selected.

13. Process according to claim 1, characterized in that in separation of polyisobutylene (PIB) molecules, as feed composition a 100% mixture of toluene/methylethyl ketone/PIB of 68–76%/13–17%/11–15% is selected, as extraction agent a 100% mixture of toluene/methylethyl ketone of 75–85%/15–25% is selected, a temperature $T_1$ of 20°–24° C. is selected and an operating concentration of 3–5% PIB is selected.

14. Process according to claim 1. characterized in that in the polymer charging of the fractionating column in the case of fractionation in the subcritical range a polymer concentration of ⅔ of the critical concentration is selected and in the case of the supercritical fractionation a concentration of 4/3 to 7/3 of the critical concentration is selected.

15. Process according to any one of the preceding claims for the processing or recycling and reuse of plastics.

16. Use of the polymer fractionated according to claim 1 as dispersing agent and/or as grinding agent for filler and/or minerals and/or pigments.

17. Use according to claim 16 for the paper industry.

18. Apparatus for carrying out the method according to claim 1 characterized by comprising
an extraction column (10) having an elongated housing which comprises a lower section having a first temperature control means (17) and an adjoining upper second section having a second temperature control means (18) and a first inlet (15) for feed/extraction agent nearer to the upper end of the extraction column, a second inlet (14) for extraction agent/feed nearer to the lower end of the extraction column, a fraction discharge (16) at the upper end of the extraction column and a fraction discharge (12) at the lower end of the extraction column.

19. Apparatus according to claim 18, characterized in that the extraction column contains filling bodies (11).

20. Apparatus according to claim 19, characterized in that the filling bodies (11) are free of flushable and liquid-filled cavities and have a surface to which neither of the two phases adheres.

21. Apparatus according to claim 18, characterized in that the extraction column is a continously or periodically agitated column.

22. Apparatus according to claim 21, characterized in that the agitated column is a Scheibel column.

23. Apparatus according to claim 18, characterized in that the extraction column contains one or more mixer-separator stages.

24. Apparatus according to claim 18 characterized in that the extraction column (10) comprises instead of the two temperature control means (17) and (18) a temperature control means which generates a temperature gradient along the fractionating column.

25. A process according to claim 1, wherein the homogeneous feed comprises polymer molecules of different molecular weight and of chemically identical structural elements.

26. A process according to claim 25, wherein the polymer molecules are of a linear structure.

27. A process according to claim 1, wherein the homogenous feed is supplied to an intermediate region of the extraction column.

* * * * *